United States Patent [19]

Teng et al.

[11] Patent Number: 4,610,888

[45] Date of Patent: Sep. 9, 1986

[54] BEER FOAM ENHANCING PROCESS AND APPARATUS

[75] Inventors: James Teng; John H. Dokos, both of St. Louis, Mo.

[73] Assignee: Anheuser-Busch Companies, Inc., St. Louis, Mo.

[21] Appl. No.: 735,443

[22] Filed: May 17, 1985

[51] Int. Cl.[4] .......... A23L 1/42

[52] U.S. Cl. .......... 426/569; 426/592; 222/4

[58] Field of Search .......... 426/66, 67, 118, 116, 426/235, 312, 319, 561, 564, 569, 592, 474, 477, 590

[56] References Cited

U.S. PATENT DOCUMENTS

| | | | |
|---|---|---|---|
| 53,692 | 4/1866 | Sirret . | |
| 688,586 | 2/1901 | Brake . | |
| 936,462 | 10/1909 | Levin . | |
| 1,623,597 | 4/1927 | Humphrey . | |
| 1,646,916 | 10/1927 | Lamarque et al. . | |
| 2,028,283 | 1/1936 | Howard et al. | 225/8 |
| 2,034,623 | 3/1936 | Kraft | 225/8 |
| 2,039,564 | 5/1936 | Smith | 225/9 |
| 2,109,978 | 3/1938 | Seitz et al. | 225/9 |
| 2,125,248 | 7/1938 | Taylor | 225/40 |
| 2,160,501 | 5/1939 | Hedges et al. | 225/1 |
| 2,208,611 | 7/1940 | Taylor | 225/41 |
| 2,220,877 | 11/1940 | Gordon | 225/5 |
| 2,310,313 | 2/1943 | Pivert | 225/6 |
| 2,327,444 | 8/1943 | Nigbor | 225/6 |
| 2,342,972 | 2/1944 | Roy et al. | 426/474 |
| 2,371,028 | 3/1945 | Christ | 225/9 |
| 2,675,822 | 4/1954 | Redlin | 137/170.3 |
| 2,707,624 | 5/1955 | Shames et al. | 261/76 |
| 3,728,129 | 4/1973 | Sargeant | 426/569 |
| 3,761,066 | 9/1973 | Wheeler | 261/78 |
| 4,279,938 | 7/1981 | Hildebrand | 426/474 |

OTHER PUBLICATIONS

Making Nitrogen In-House for Irish Stout, Brewing & Distilling International, Nov. 1984.

Putting the Cream Topping, Brewing & Distilling International, Dec. 1984.

*Primary Examiner*—Raymond N. Jones
*Assistant Examiner*—Carolyn Paden
*Attorney, Agent, or Firm*—Gravely, Lieder & Woodruff

[57] ABSTRACT

A beer foaming process and apparatus in which a smooth stable foam is formed by intimately admixing a nitrogen containing gas, preferably air, by a Venturi effect in a nozzle positioned on the beer tap. The nozzle has a mixing chamber with a perforated plate at its intake end to divide the flow of beer from the keg into smaller streams of higher velocity in the mixing chamber, intake ports in the side walls of the chamber for admitting gas into the chamber, and a screen of 30 to 200 mesh at the discharge end of the nozzle to form the stable foam discharged from the chamber.

8 Claims, 4 Drawing Figures

BEER FOAM ENHANCING PROCESS AND APPARATUS

BACKGROUND OF THE INVENTION

The invention relates to the field of beer dispensing and apparatus therefore and in particular relates to a process for stabilizing foam from draft beer as it is dispensed.

In the art of making beer, it is very important that the appearance of the beer in the glass be attractive to the user. While flavor is the aspect most talked about in beer, appearance is the first thing noticed by the customer and that makes it important. The shade and depth of color, the clarity, beading, type of head foam, the foam retention, and the foam cling, all contribute to making the initial impression. It is desirable that the foam atop a glass of beer dispensed from a tap be smooth, creamy, be relatively stable and have an attractive taste. The incorporation of air or nitrogen into beer as it is dispensed at the tap spout gives a head of very fine bubbles with excellent stability and a creamy slightly sweet desirable taste.

The type of malt beverage which heretofore has attracted the most attention in connection with a stable creamy head is Irish stout. The dispensing of stout so as to achieve this desirable head has passed through numerous evolutionary stages. Originally the stout was krausened by the addition of fresh wort containing yeast, so that the stout developed about 30 to 35 psi pressure in the cask and when dispensed, issued as a fine smooth cream. As the cask was used it tended to become flat, so that the stout then was blended and served as a mixture of flat stout with a creamy head from a new high conditioned cask.

Later, a device known as a "Beamish Quick-One Server" was used, in which the conditioned stout was poured into a serving flask having a tap at the bottom, so that a glass was poured substantially full from the tap and then a creamy head poured from the top of the server.

Later, a dispensing procedure known as "B.D." or "bottling draught" was used. In this procedure, the pub owner utilized two casks of stout, one filled with a higher conditioned stout and one with a flat stout or "B.D." stout. A charge was drawn from the conditioned cask and the remainder of the glass filled with "B.D." stout.

There is a Scottish procedure which utilized a top pressure of air on a cask, but this sometimes resulted in differences in taste of the beverage from the cask due to oxidation effects.

Guinness utilizes a keg having a head of pressurized nitrogen or air to produce the desired foam and then utilizes a degasing system to provide flat beer for topping of the glass after the foam has been poured.

Beamish and Crawford has utilized a system of dispensing stout in which a low pressure keg having a special dispensing tap with a spherical ball mounted thereon is used. A portion of the stout is routed to the ball and pressurized with a mixture of nitrogen and $CO_2$, so that manipulation of the dispensing valve allows for production of foam from the spherical head and subsequent filling with flat stout from the keg.

Presently a procedure is used whereby the beer is saturated with nitrogen at the plant prior to kegging. Foam is produced by releasing the beer through a small orifice in the tap and the remainder of the glass is filled with flat beer by bypassing the orifice. This too is caused by manipulation of the dispensing valve in the tap.

The foregoing described procedures are not totally satisfactory and, if nitrogen is used, an additional expense is involved. Also, several of the processes require the use of high pressure kegs, which, in turn, necessitates heavier duty installation in the pub.

It also is the general practice and custom in the brewing industry to exclude all possible air from contact with beer because of the known oxidizing effect of air on beer. Oxygen, when in contact with beer for periods of time tends to cause off flavors, etc. Accordingly, the incorporation of air into beer is contrary to present practices, but when added immediately prior to the beer entering the glass, the known deleterious effects are avoided.

Accordingly, it is an object of the present invention to provide a relatively inexpensive procedure for processing a foamed malt beverage which has stability in the foam. A further object is to provide an apparatus which can be utilized for dispensing both flat beer and foamed beer having a high degree of stability to the foam.

We have found that, using a Venturi effect, we are able to incorporate air or nitrogen in substantial amounts into the beer as it leaves the tap and prior to its entering the glass of the user. We have found that by dividing the stream of beer from the tap into a series of smaller streams of higher velocity, drawing air into the streams, and then creating turbulence in the stream so as to mix the air therein, we can create a beer foam comprised of bubbles of very small diameter which is extremely stable over a period of time. By combining this type nozzle with a conventional nozzle, we are able to draw a glass of beer having a head of a smooth, creamy foam which is stable and long lasting.

These and other objects and advantages will become apparent in the drawings and description hereinafter set forth.

SUMMARY OF THE INVENTION

This invention comprises a process and apparatus for forming a stable creamy foam from a malt beverage utilizing a unique dispensing mechanism for incorporating air or nitrogen into the beer after it leaves the tap and prior to entering the receptacle from which it is to be drunk.

DESCRIPTION OF THE DRAWINGS

In the drawings where like numerals refer to like parts wherever they occur.

DETAILED DESCRIPTION

Figure 1:
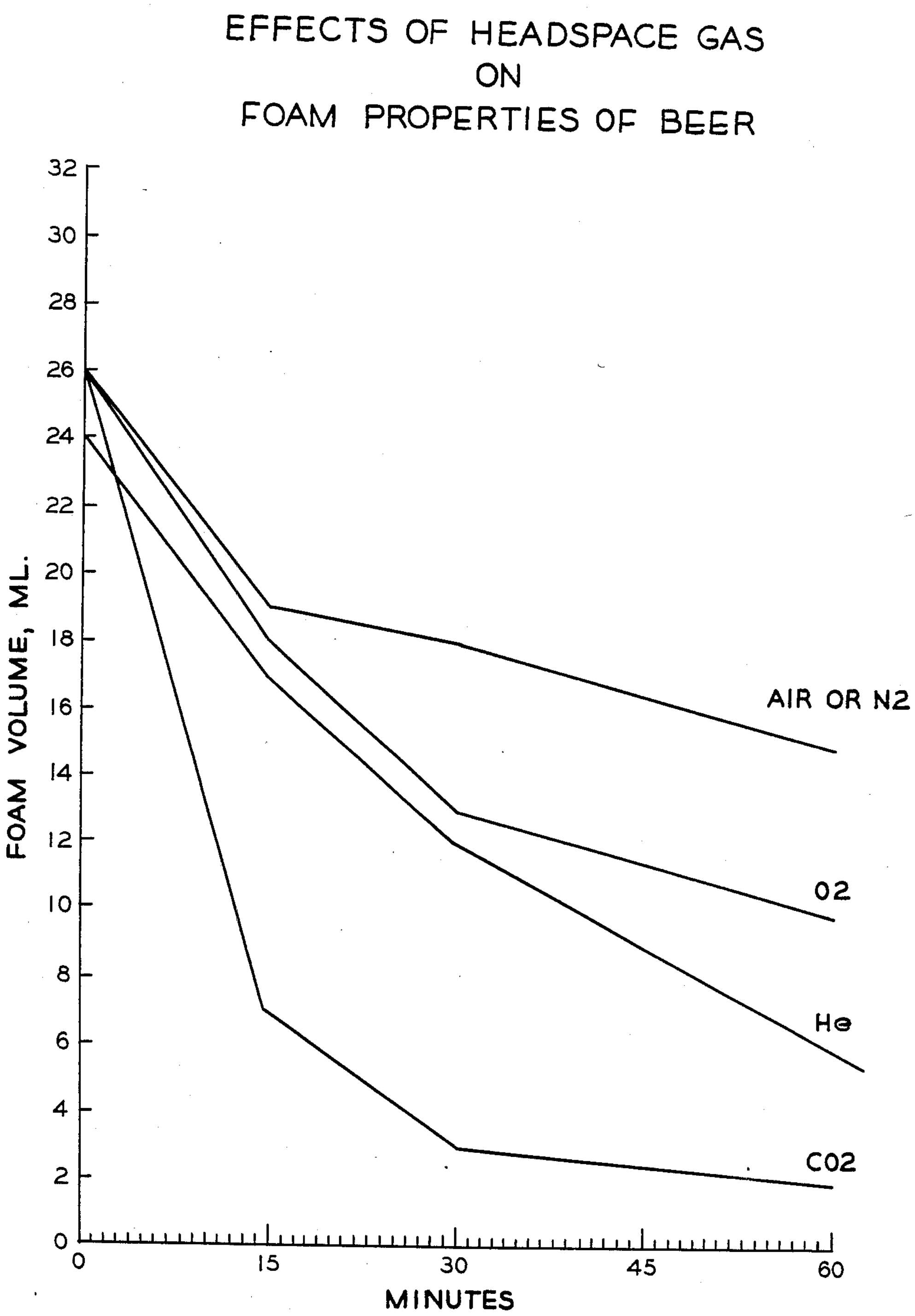
FIG. 1 is a graph showing the foam properties of beer as a function of time and the type of gas mixed into the foam.

In developing the data for the curves designed as FIG. 1, we used a method of testing for foam which we originated and which gives accurate, reproducible and representative results. This method is hereinafter described.

Procedure for Measuring Foamability and Foam Stability

1. Decarbonate beer and bring to room temperature (24° to 25° C).
2. Transfer 25 ml decarbonated beer into a clean, dry, 50 ml glass stoppered, graduated cylinder. All glassware must be cleaned in chromic-sulfuric acid solution, rinsed well with tap, then deionized water and oven dried before using for foam test.
3. Fill head space above beer with gas to be tested.
4. Seal top.
5. Hold cylinder in a horizontal position, and shake vigorously for 30 seconds.
6. Let stand for 30 seconds. Read total volume and liquid level. Difference=ml foam—foamability.
7. Read after 15 min. ml foam/foamability=foam stability after 15 min.
8. Read again after 30 min, 60, 90 min. and calculate foam stability at each time interval.

FIG. 1 shows that $N_2$ or air (which is 79% $N_2$ and performs the same function in foaming) have the same original volume as beer foam formed from $CO_2$, but that the stability is substantially greater. Oxygen ($O_2$) too has the same original volume as $N_2$ and air, but the stability is less. Helium (He) has less original volume than $N_2$ and its stability approximates that of oxygen for 30 minutes after which it drops off.

Figure 2:
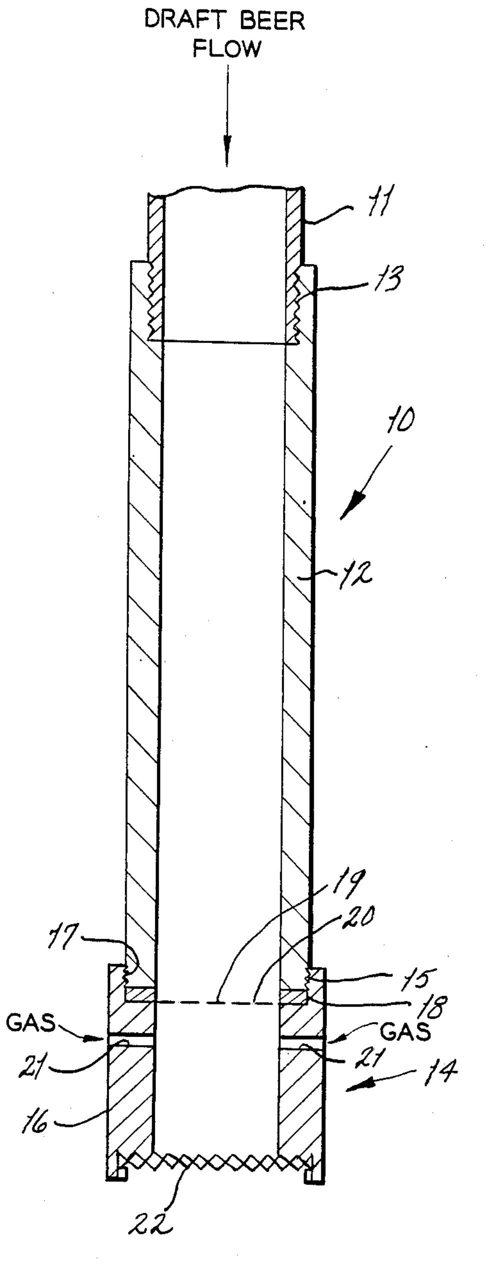
FIG. 2 is a vertical sectional view of the novel mixing nozzle of this invention applied to a beer tap.

FIG. 2 shows a device for incorporating gas into beer and forming the thick creamy long lasting foam desired from this invention.

The dispensing tap 10 is attached to a draft beer tap line 11 through which flows draft beer at the usual $CO_2$ carbonation pressure of 12–15 psi and 42°–46° F. The tap 10 includes a body section 12 threaded at one end 13 to the tap line 11 and having a mixing nozzle 14 threaded at the other end 15. If desired the nozzle 14 can be attached directly to the end of a conventional beer tap.

The nozzle 14 is similar to an aerator attached to a conventional household water faucet except that it is used for a different purpose. The conventional household faucet aerator is used for the purpose of diffusing the stream of water so as to avoid splashing water in the sink or other receptacle into which it flows. Also, since the function of the present invention is different, the parameters of flow velocity, orifice size, number and spacing, air intake, screen size, etc. are quite different.

The nozzle 14 includes a cylindrical housing 16 provided with a threaded counterbore 17 on one end to connect the housing 16 to the tubular body 12. A seal 18 is placed in the counterbore 17 to seal the joint between the housing 16 and the body 12. Also positioned in the counterbore 17 is a perforated plate 19 which is provided with openings 20 of from about 0.0355 to about 0.055 inches in diameter. The openings 20 form Venturi orifices and break up the flow of beer into smaller streams. There also is a pressure drop across the plate 19 which starts the beer foam production. The Venturi plate 19 has about 5 to about 10% of its surface area formed into the openings 20.

The beer has a linear velocity of about 21 to about 23 in/sec. in the line 12 and this increases to about 130 to about 146 in/sec. after the beer passes through the plate 19.

To complete the Venturi effect, gas (air or $N_2$) enters the nozzle 14 through side openings 21 which may be in the form of slots or circular openings. As the gas passes with the foaming beer through the nozzle, it is intimately mixed and formed into small stable bubbles by an end screen 22 positioned at the discharge end of the nozzle 14. The screen 22 has openings of about 30 to about 200 mesh in size and may be a single screen or a plurality of screens of larger size openings. A single screen is preferred to increase flow rate.

Figure 3:
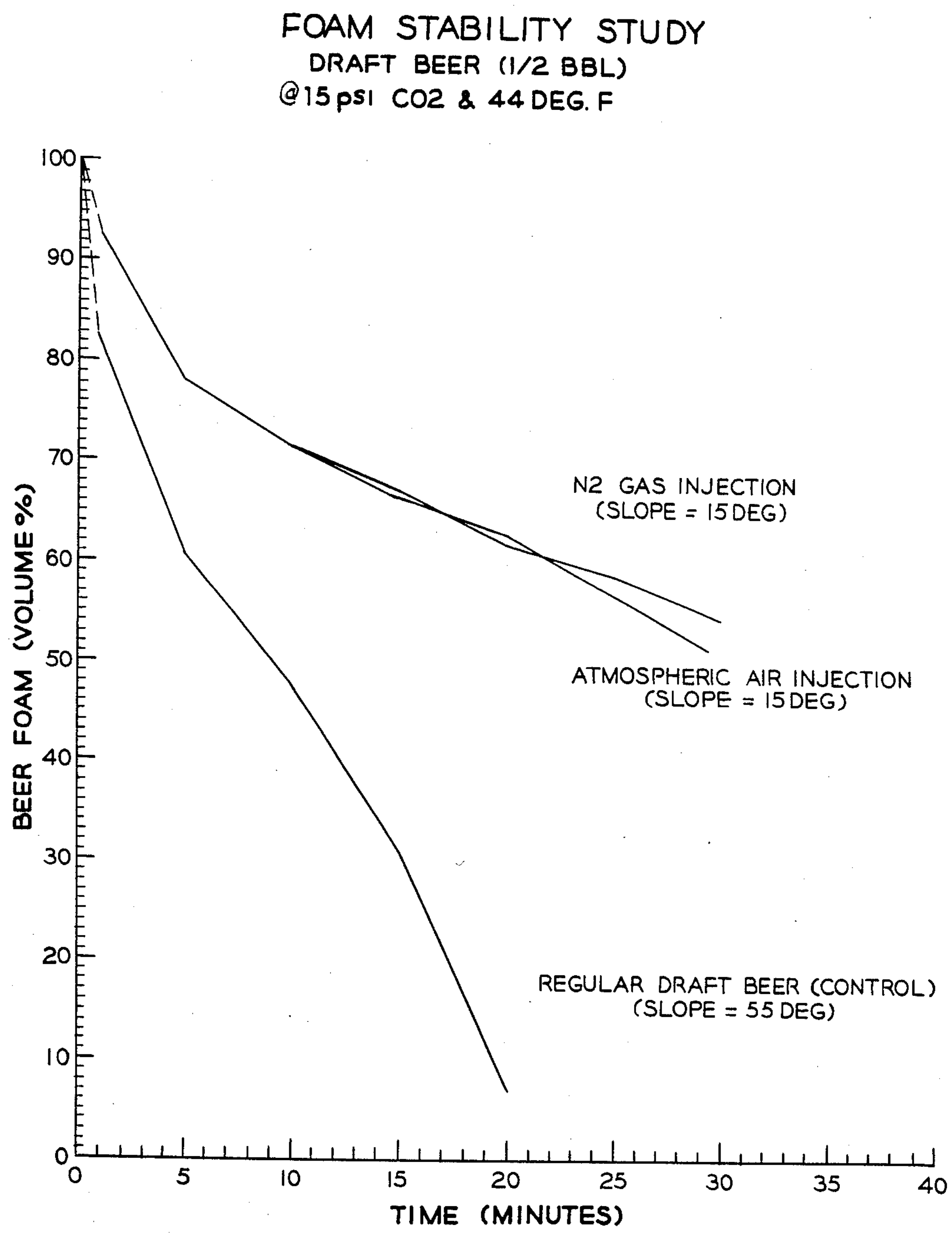
FIG. 3 is a graph of beer foam stability as a function of time of regular draft beer and draft beer foamed with air and $N_2$.

FIG. 3 shows a comparison of conventional draft beer, with no gas injected and dispensed through a conventional beer tap, and the same beer dispensed through our Venturi mixing nozzle with air or $N_2$ gas injected. While all of the beers are 100% foam when poured into the graduates, measurements were first noted at one (1) minute and the regular beer already had lost about 20% of its volume whereas the gas treated foam had lost only about 7% of its volume. The difference became more pronounced as time passed. The slope of the regular beer curve (which measures the rate of foam decline) was about 55°, whereas the slopes of the curves of the gas treaded foams was about 15°. There is substantially no difference between the foam created by injecting $N_2$ and the foam created by injecting air. Air is preferred because of cost and convenience, i.e., no shroud is needed as would be the case if $N_2$ is the gas.

Figure 4:
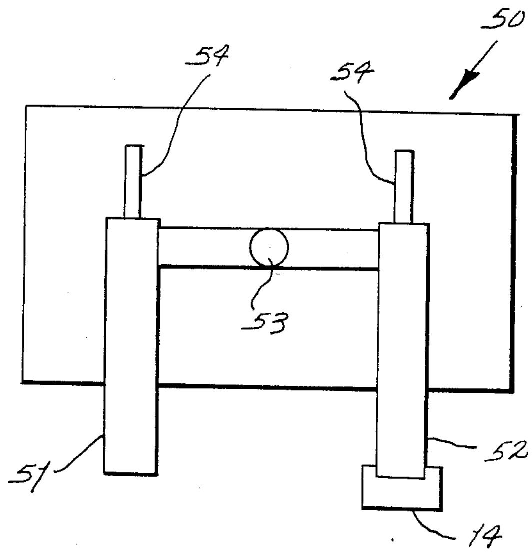
FIG. 4 is a front elevational view of a dispensing tap for beer.

FIG. 4 shows a dispensing head 50 which would be required in the use of this invention. The head 50 has two taps 51 and 52. The tap 51 is conventional and the tap 52 is provided with the nozzle 14 of this invention. Both taps 51 and 52 are connected to a beer supply line 53 and flow to the taps is controlled by valve handles 54. In filling a glass, conventional or flat beer is poured into a glass through the conventional tap 51 and foam is applied by the tap 52.

Thus, it is seen that the present invention achieves all of the objectives and advantages sought theretofore. This application is intended to cover all changes and modifications and variations of the examples herein chosen for purposes of the disclosure which do not constitute departures from the spirit and scope of the invention.

What is claimed is:

1. A process for foaming malt beverages comprising the steps of (a) moving a pressurized malt beverage stream from a container through a passage,
(b) dividing the malt beverage stream into a plurality of smaller streams of higher linear velocity and discharging the smaller streams into a mixing chamber,
(c) injecting a nitrogen containing gas into the mixing chamber,
(d) intimately mixing the nitrogen containing gas into the malt beverage streams, and
(e) discharging the malt beverage mixed with nitrogen containing gas as a thick creamy stable foam.

2. The process of claim 1 wherein the carbonated malt beverage stream is at a pressure of about 12 to about 15 psi.

3. The process of claim 1 wherein the pressurized malt beverage stream is moved at a linear velocity of about 21 to about 23 in/sec. in the passage and about 130 to about 146 in/sec. into the mixing chamber.

4. The process of claim 1 wherein the malt beverage is passed through a plurality of openings of about 0.0355 to about 0.055 inches in diameter prior to entering the mixing chamber.

5. The process of claim 1 wherein the nitrogen containing gas is drawn into the mixing chamber by a Venturi effect.

6. The process of claim 5 wherein the nitrogen containing gas drawn into the mixing chamber is air.

7. The process of claim 5 wherein the nitrogen containing gas drawn into the mixing chamber is pure $N_2$.

8. The process of claim 1 wherein the nitrogen containing gas and the malt beverage are passed through a screen of about 30 to about 200 mesh to intimately mix the two.

* * * * *